(12) United States Patent
Watanabe et al.

(10) Patent No.: US 6,195,684 B1
(45) Date of Patent: *Feb. 27, 2001

(54) CONFERENCE AIDING SYSTEM AND COMPUTER MEMORY PRODUCT FOR RELATING AN OBJECT TO A FILE ON A DISPLAY SCREEN

(75) Inventors: Satoru Watanabe; Akihiko Obata, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/940,006

(22) Filed: Sep. 29, 1997

(30) Foreign Application Priority Data

May 20, 1997 (JP) .................................................. 9-130171

(51) Int. Cl.[7] ............................. G06F 13/38; G06F 15/17
(52) U.S. Cl. ............................ 709/204; 709/208; 345/330
(58) Field of Search .................................. 345/330, 331, 345/2, 113; 709/200, 204, 205, 208, 248

(56) References Cited

U.S. PATENT DOCUMENTS

| 5,280,583 | * | 1/1994 | Nakayama et al. | 395/200 |
| 5,442,788 | * | 8/1995 | Bier | 395/650 |
| 5,537,526 | * | 7/1996 | Anderson et al. | 395/148 |
| 5,581,670 | * | 12/1996 | Bier et al. | 395/326 |
| 5,634,018 | * | 5/1997 | Tanikoshi et al. | 395/329 |
| 5,745,764 | * | 4/1998 | Leach et al. | 709/303 |
| 5,801,701 | * | 9/1998 | Koppolu et al. | 345/352 |
| 5,822,525 | * | 10/1998 | Tafoya et al. | 395/200.34 |
| 5,838,321 | * | 11/1998 | Wolf | 345/343 |

FOREIGN PATENT DOCUMENTS 2-171864   7/1990   (JP) .
8-256327   10/1996  (JP) .

* cited by examiner

*Primary Examiner*—Mark Rinehart
*Assistant Examiner*—Paul Kang
(74) *Attorney, Agent, or Firm*—Staas & Halsey LLP

(57) ABSTRACT

An electronic conference aiding system having a structure in which one common information processing apparatus having a common display unit having a size sufficiently large for attendants to commonly watch display and a plurality of personal information processing apparatuses each having a personal display unit for exclusively creating and displaying information at a position adjacent to each attendant are connected into a network through data communication passage, wherein a comment, a reference material or the like is, as an object, related to a file displayed on the common display unit or the personal display unit in such a manner that the object is displayed at an unspecific position on the file to indicate the relation as a previous step in place of immediately embedding the object at a specific position of the file. The necessity of considering the position on the displayed file can be eliminated and the object is related to the overall portion of the file when the object is displayed. Thus, a larger number of objects are related to the file and displayed in a short time.

14 Claims, 14 Drawing Sheets

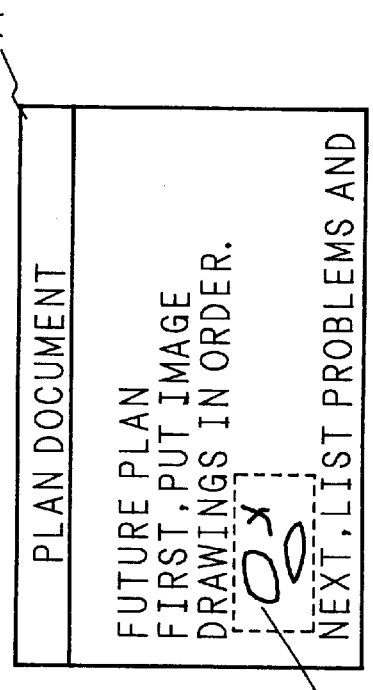
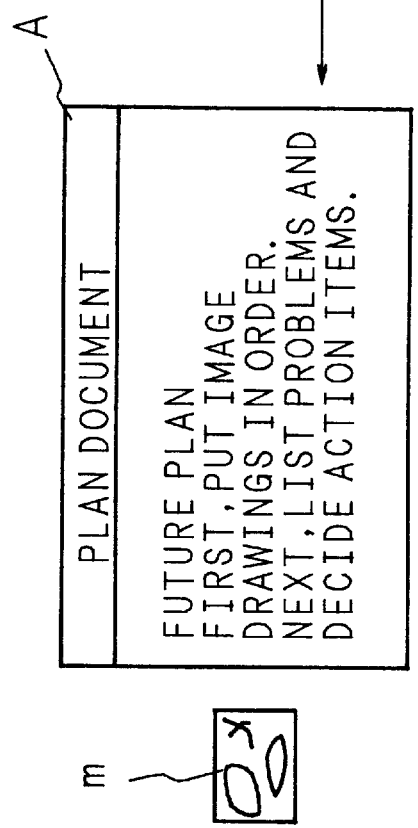
FIG. 1A PRIOR ART
FIG. 1B PRIOR ART
(FILE A AND OBJECT m ARE IRRELEVANT) (OBJECT m IS EMBEDDED IN FILE A)

(FILE A AND OBJECT m ARE DISPLAYED IN NO RELATION)

(OBJECT m IS DISPLAYED IN ATTACHMENT RELATION WITH FILE A)

(OBJECT m IS DISPLAYED IN EMBEDDING RELATION WITH FILE A)

CONFERENCE AIDING SYSTEM AND COMPUTER MEMORY PRODUCT FOR RELATING AN OBJECT TO A FILE ON A DISPLAY SCREEN

BACKGROUND OF THE INVENTION

1. Field of the Invention

The present invention relates to a conference aiding system for realizing an electronic conference and improving an efficiency to perform the conference, and more particularly to a conference aiding system for easily relating an object to a file on a display screen for use in the conference.

2. Description of the Prior Art

An electronic conference aiding system has been developed which uses a work station or personal computer to electronically create, display, instruct and move information items, which are opinions of attendants of a conference. The system to causes opinions of the attendants to smoothly communicated and proceedings of the conference to be satisfactorily stored in order to improve the quality of the conference. A conference aiding system of the foregoing type usually has a. structure in which one common information processing apparatus comprises a monitor having a large size and arranged to display information of attendants, i.e. large size information for use in place of a blackboard. A monitor control unit for controls the monitor to cause the monitor to display various information items and input means shared by the attendants and plurality of personal information processing apparatuses are used in the conference aiding system. Each comprises a personal computer, a monitor having a small size to display various information items, and input means provided for the respective attendants to input information. The personal information apparatuses are connected to one another through a serial synchronized communication line, such as a LAN. To aid the conference, which is a coordinated operation, the shared input means or the individual input means are used to enable each attendant to arbitrarily create, instruct and move information.

If a file started up by an arbitrary application having a function (for example, OLE: Object Linking and Embedding, Microsoft, U.S.) of embedding an object (a unit for controlling information with a unified attribute and operating information) can be displayed on the large monitor in the above conference aiding system, a tentative file is displayed on the large monitor to request comments from the attendants in such a manner that the comments from the attendants can be embedded at arbitrary relevant positions of the file and displayed on the monitor. Specifically, attendants required to make comments use a shared input means of the common information processing apparatus or the individual input means of the personal information processing apparatus to create objects (opinions of the attendant and/or relevant information). If the object is created by the personal information processing apparatus, the attendant sends the created object to the common information processing apparatus. Then, the attendant embeds the object at an arbitrary position of the file on the large monitor so that the object is displayed on the monitor.

If each attendant displays a file, to which a reference is required to be made, on the small monitor adjacent to the attendant, the attendant creates an object (a memorandum or reference material) relating to the file. Then, if the attendant determines that the object relates to the file, the created object can be embedded at an arbitrary position of the file so as to be displayed on the small monitor in a case where the starting application of the file has the function of making arbitrary information to be relevant to the object and embedding it in the file.

FIGS. 1A and 1B are schematic views showing examples of display of an embedded object in the file. Although an object m and a file A are initially displayed in such a manner that they are not related to each other (see FIG. 1A), selection of an embedding process causes display to be performed in such a manner that the object m is embedded at an arbitrary position in the file A (see FIG. 1B). In this case, the object m is inserted into an arbitrary position in the file A.

When a comment or a reference material relating to the file displayed on the large common monitor is, by the attendant, made to be relevant as an object and embedded so as to be displayed, the above-mentioned conventional conference aiding system is structured to determine information items in the file between which the object is embedded. Then, the object is inserted into the determined position. However, the above-mentioned method of making the object to be relevant to the file has the following problem.

Since the object is inserted between information items in the file, the position of information of the file, which has been displayed, will considerably be shifted. Therefore, an object, which does not considerably related to the file, and an object (for example, an opinion about the file), the position of which to be embedded cannot precisely be specified, cannot easily be presented to the other attendants. If an object of the foregoing type is forcibly embedded into an arbitrary position and displayed on the monitor, a reason why the object is embedded into the position cannot be detected later. Thus, confusion will happen.

An object can be displayed adjacent to a file without use of the embedding function in such a manner that the object does not relate to the file. When the file has been erased or moved, there arises a problem in that the object is not erased or moved corresponding to the file. Another problem arises in that the file to which the displayed object corresponds cannot be detected if a plurality of files are opened.

As described above, use of only the embedding function to make the object relevant to the file is insufficient to easily present objects, such as comments or reference materials, relating to the file serving as a tentative file and displayed on the common monitor having a large size. Thus, the conference cannot smoothly be performed. Also in a case where the attendants add objects, such as memorandums or reference materials, to the file of the reference material displayed on the individual monitors each having a small size, a problem experienced with the common monitor hating the large size arises. As described above, use of the function of embedding an object into a file to make the object relevant to the file is insufficient to efficiently perform an electronic conference. Therefore, an electronic conference aiding system having a new method for making an object relevant to a file has been required.

BRIEF SUMMARY OF THE INVENTION

An object of the present invention is to provide a conference aiding system for displaying an object while relating the object to a displayed file, which is capable of removing a necessity for an attendant to consider the position at which the object is displayed when the object is related to the file.

Another object of the present invention is to provide a conference aiding system which is capable of displaying a larger number of objects while relating the same to a file in a short time.

Another object of the present invention is to provide a computer memory product, on which a computer program capable of realizing the above-mentioned conference aiding system has been recorded.

The conference aiding system according to the present invention has the above-mentioned conventional method (hereinafter called an "embedding method") in which the relation (a second relation) of an object to a file is established in a state where the object is inserted and embedded at an arbitrary position of the displayed file and a method (hereinafter called an "attachment method") in which the relation (a first relation) of an object to a file is established in a state where the object is made to freely be moved on the displayed file regardless of the displayed file. When a comment, a reference material or the like is, as an object, related to the displayed file, the object is displayed at an unspecific position on the file to indicate the relation as a previous step in place of immediately embedding the object at a specific position of the file. Therefore, the object can be related to the file and displayed without the necessity of considering the position on the displayed file. Thus, a larger number of objects can be related to the file and displayed in a short time.

The above and further objects and features of the invention will more fully be apparent from the following detailed description with accompanying drawings.

BRIEF DESCRIPTION OF THE SEVERAL VIEWS OF THE DRAWINGS

FIGS. 1A and 1B are diagrams showing the conventional concept of the relation establishment (by an embedding method) of an object to a file;

DETAILED DESCRIPTION OF THE INVENTION

Figure 2:
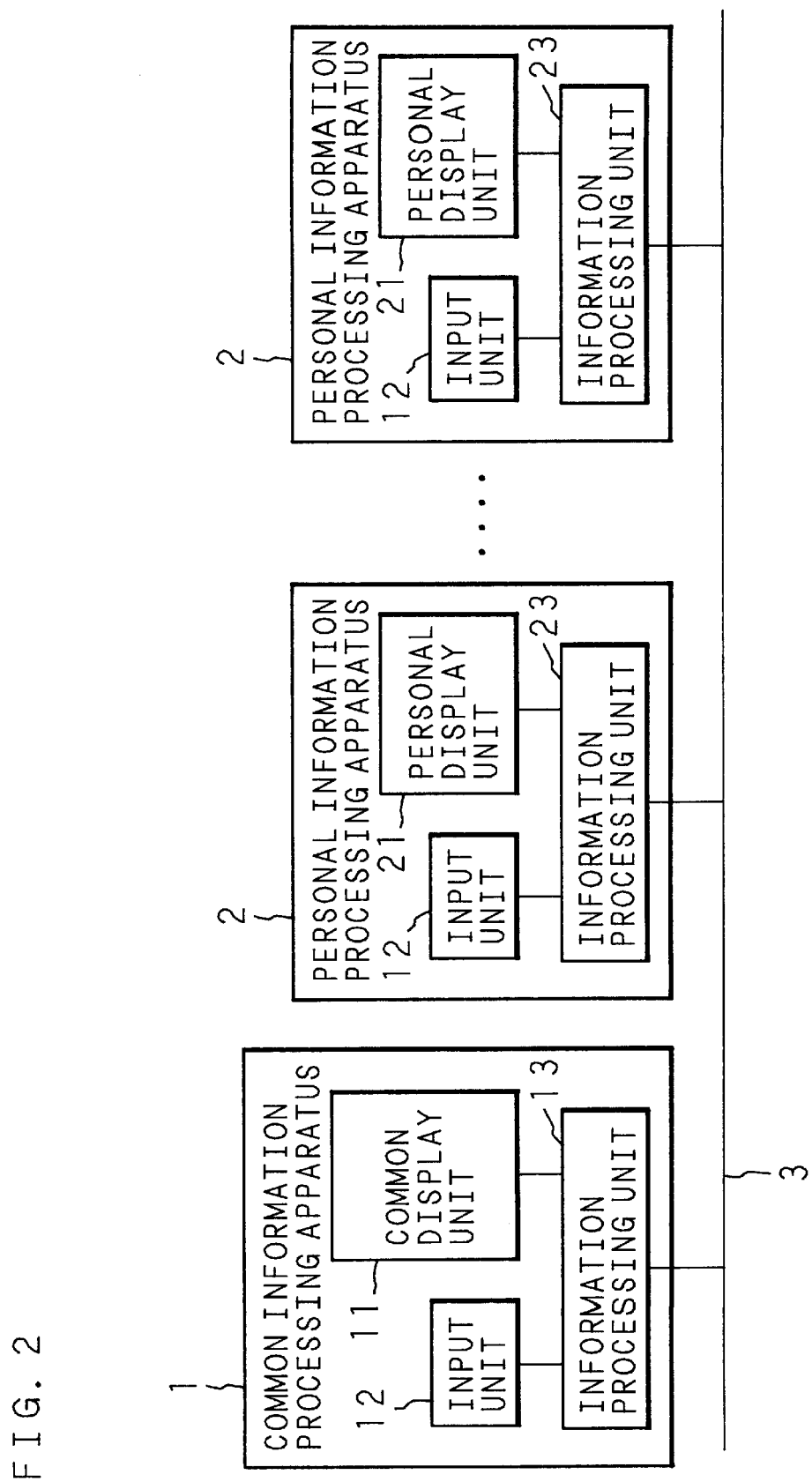
FIG. 2 is a schematic view showing the principle of a conference aiding system according to the present invention.

FIG. 2 is a schematic view showing the principle of a conference aiding system according to the present invention. The conference aiding system according to the present invention has a structure in which one common information processing apparatus 1 serving as a main information processing apparatus and a plurality of personal information processing apparatuses 2 serving as sub-information processing apparatuses are connected to one another in the form of a network formed by a data communication passage 3. The common information processing apparatus 1 comprises a common display unit 11 serving as a main display unit, an input unit 12 and an information processing unit 13. Each personal information processing apparatus 2 comprises a personal display unit 21 serving as a sub-display unit, an input unit 22 and an information processing unit 23.

Figure 3:
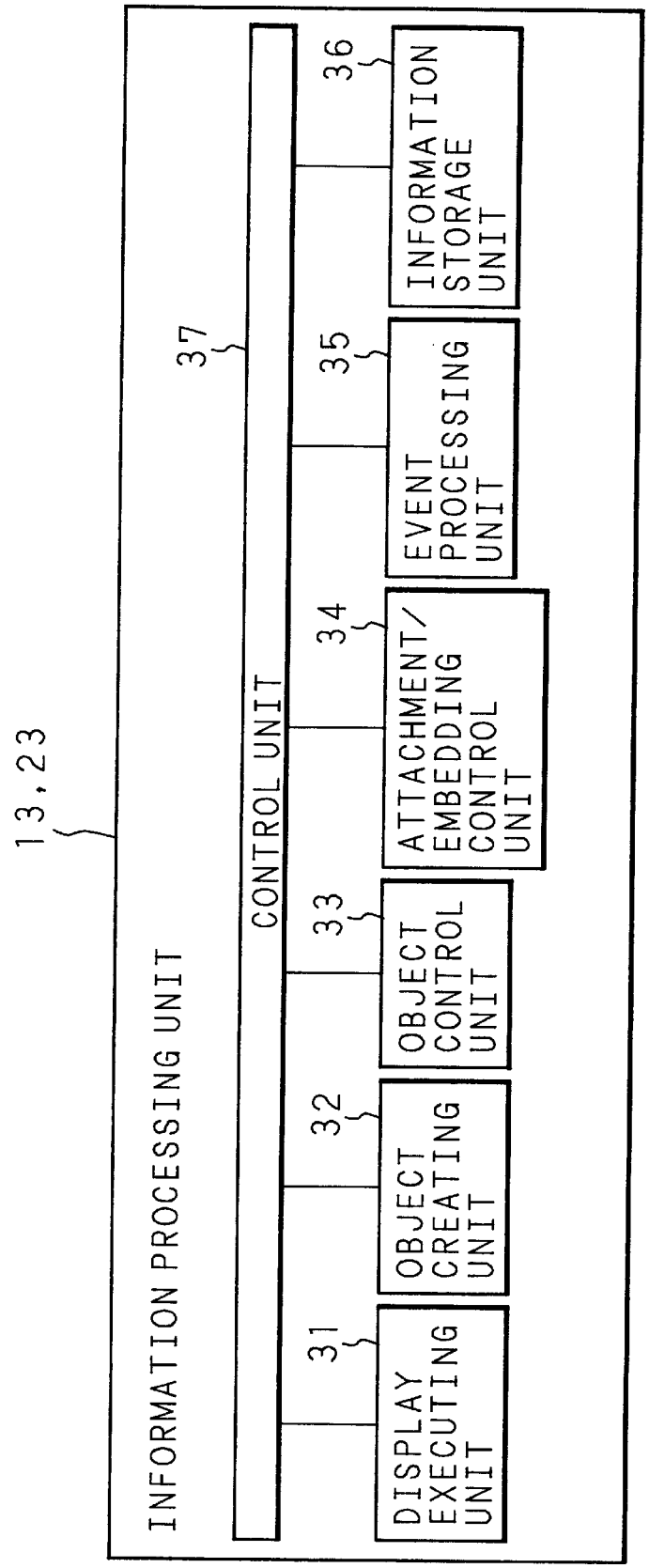
FIG. 3 is a block diagram showing the structure of an information processing unit of a common information processing apparatus and a personal information processing apparatus.

FIG. 3 is a block diagram showing the structures of the information processing unit 13 of the common information processing apparatus 1 and the information processing units 23 of the personal information processing apparatuses 2. Each of the information processing units 13 and 23 comprises a display executing unit 31, an object creating unit 32, an object control unit 33, an attachment/embedding control unit 34, an event processing unit 35, an information storage unit 36 and a control unit 37 for controlling the operations of the foregoing units.

The display executing unit 31 of each of the information processing units 13 and 23 displays information on each of the common display unit 11 and the personal display unit 21. The object creating unit 32 creates relevant information (an object), such as a comment and a reference material, relating to the file. The object control unit 33 stores and controls an object created by the object creating unit 32 or an object acquired from the personal information processing apparatus 2 (or the common information processing apparatus 1 or another personal information processing apparatus 2) through the data communication passage 3. The attachment/embedding control unit 17 makes a specific object to be relevant to a file by the attachment method and controls the same to display the same on the file to meet an attachment request from a user, or makes a specific object to be relevant to a file by the embedding method and controls the same to embed and display the same at a specific position on the file to meet an embedding request. The attachment/embedding control unit 34 as well as cancels the relation established by the attachment method or the embedding method. The event processing unit 35 executes events relating to the object except for the attachment/embedding process. The information storage unit 36 stores information (display position, the size of display and the like) about display of the file.

Figure 4A:
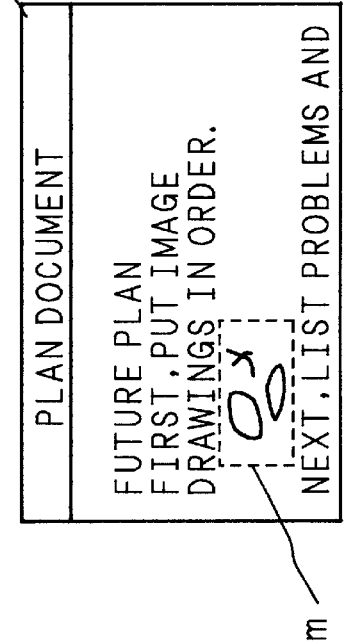
FIGS. 4A to 4C are diagrams showing the concept of the conference aiding system according to the present invention to establish the relation between a file and an object (by the attachment/embedding method)
Figure 4B:
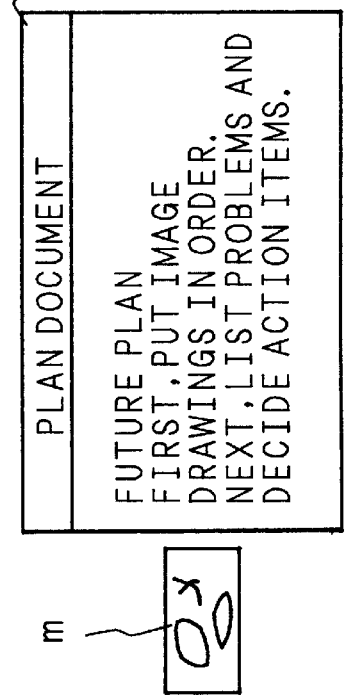
Figure 4C:
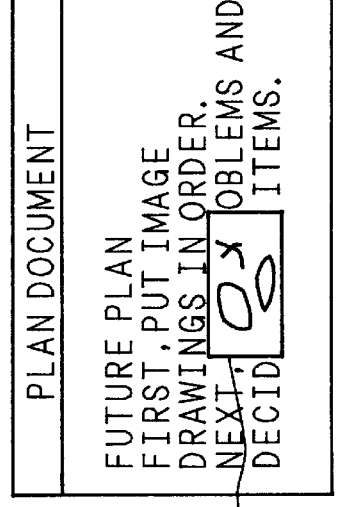

FIGS. 4A to 4C are diagrams showing the concept of the method (the attachment/embedding method) of making an object to be relevant to a file in the conference aiding system according to the present invention. When a request to attach an object m to a file A is made from a user in a state where the file A and the object m having no relation with each other are displayed together (see FIG. 4A), the attachment/embedding control unit 34 establishes the relation by the attachment method so that the object m is displayed on the file A without any instruction of the position of the object m (see FIG. 4B). At this time, the necessity of instructing the position of the object m with respect to the file A can be eliminated to establish the relation of the object m to the file A. Thus, the relation establishing process can quickly be completed. Since the object m is simply displayed in such a manner that the object m is superimposed on the file A, the configuration of information in the file A can be maintained. Since the file A and the object m are displayed without any relation, that is, they are independently displayed in the state shown in FIG. 4A, scrolling of the file A does not cause the object m to be synchronously scrolled. In the state shown in FIG. 4B in which the object m is related to the file A, movement of the file A on the display screen causes the object m to follow the file A so that the object m is moved. Thus, the object m does not protrude over the file A.

If the position of the object m must be specified after the relation has been established by the attachment method (in the state shown in FIG. 4B), a request to embed the object m into the file A is made from a user. Thus, the attachment/embedding control unit 34 establishes the relation by the embedding method so that the object m is displayed in a state where the object m is embedded at a specific position of the file A (see FIG. 4C).

If the necessity of specifying the embedding position is removed after the relation has been established by the embedding method (the state shown in FIG. 4C), the relation established by the embedding method is canceled by the attachment/embedding control unit 34. Thus, the state in which the relation is established by the attachment method can be restored (the state shown in FIG. 4B).

If the relation is not required to be established in a state where the relation has been established by the attachment method (the state shown in FIG. 4B), the attachment/embedding control unit 34 cancels the relation established by the attachment method. Thus, the original non-relation state (the state shown in FIG. 4A) can be restored.

When the relation is established by the attachment method which is the characteristic of the present invention, the following plural aspects may be employed. An object is, by the attachment/embedding control unit 34 of the common information processing apparatus 1, related to the file displayed on the common display unit 11 of the common information processing apparatus 1. An object created by the personal information processing apparatus 2 is related to the file displayed on the common display unit 11 of the common information processing apparatus 1. Moreover, an object created by the personal information processing apparatus 2 is related to the file displayed on the personal display unit 21 of the personal information processing apparatus 2.

Figure 5:
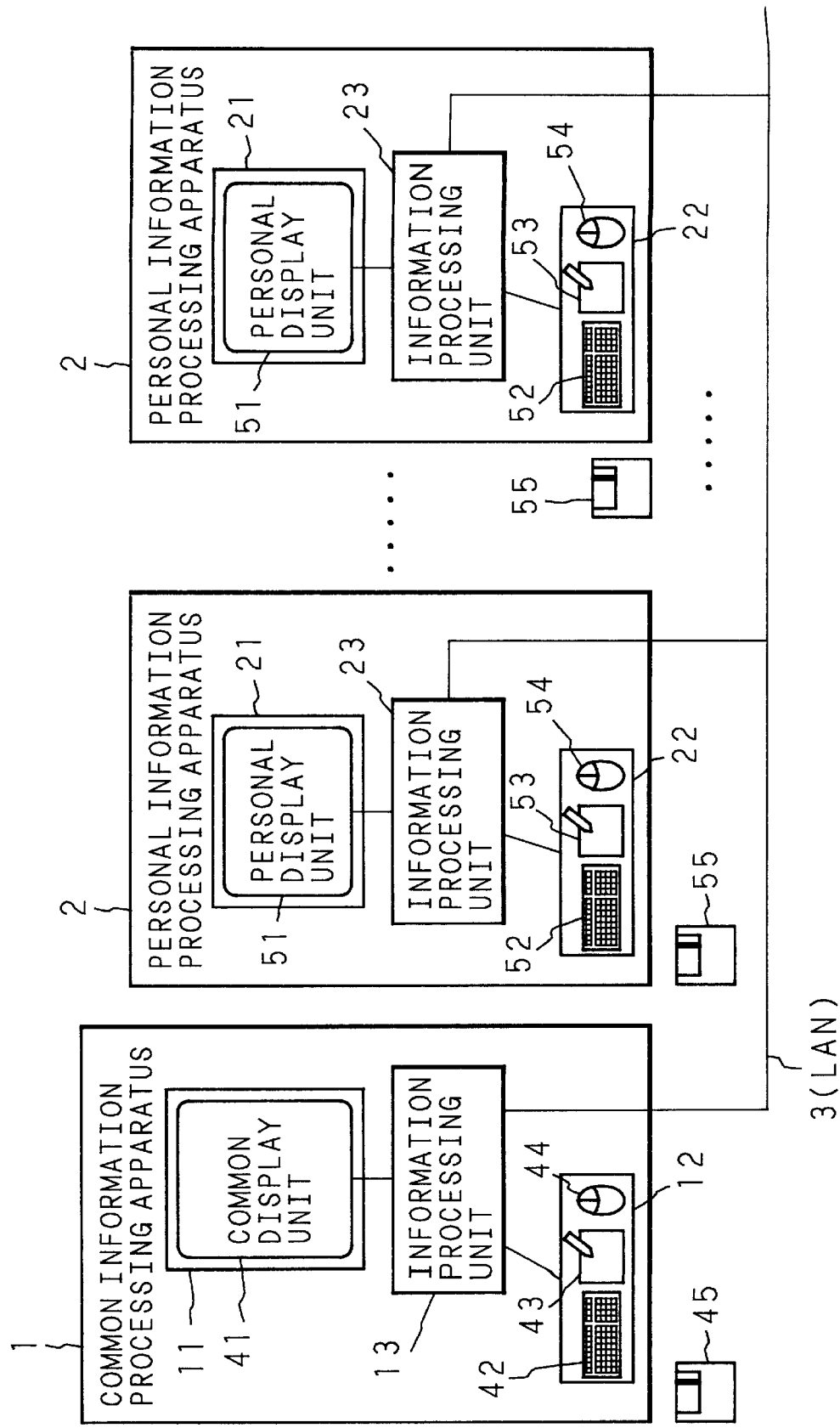
FIG. 5 is a schematic view showing an example of the basic structure of the conference aiding system according to the present invention.

FIG. 5 is a schematic view showing an example of the basic structure of the conference aiding system according to the present invention. Referring to FIG. 5, reference numeral 1 represents one common information processing apparatus. Reference numeral 2 represents a plurality of personal information processing apparatuses assigned to respective attendants. The common information processing apparatus 1 is disposed to permit all of the attendants in front of the meeting desk to commonly watch the displayed contents. On the other hand, each of the personal information processing apparatuses 2 is disposed on the meeting desk in front of the seat of the attendant so as to be positioned adjacent to the attendant and used exclusively. The common information processing apparatus 1 and the personal information processing apparatuses 2 are connected to a LAN 3 which is a data communication passage so that communication of information is permitted.

The common information processing apparatus 1 comprises the common display unit 11 incorporated with a projector having size of 50 inches to 60 inches, the input unit 12 having a touch sensor 41 attached to the upper surface of the common display unit 11, a keyboard 42 connected to the information processing unit 13, a tablet 43 having a pen and a mouse 44, and the information processing unit 13 consisting of a computer with the structure shown in FIG. 3. Each of the personal information processing apparatuses 2 comprises the personal display unit 21 in the form of a liquid crystal tablet having a size of about 10 inches, the input unit 22 having a touch sensor 51 attached to the upper surface of the personal display unit 21, a keyboard 52 connected to the information processing unit 23, a tablet 53 having a pen and a mouse 54, and the information processing unit 23 consisting of a personal computer with the structure as shown in FIG. 3. The information processing unit 13 consisting of the computer and the information processing unit 23 consisting of the personal computer are arranged to have computer programs for performing processes, to be described later, which are loaded from computer memory products 45 and 55, such as magnetic disks, on which the computer programs have been recorded.

First Embodiment

Figure 6:
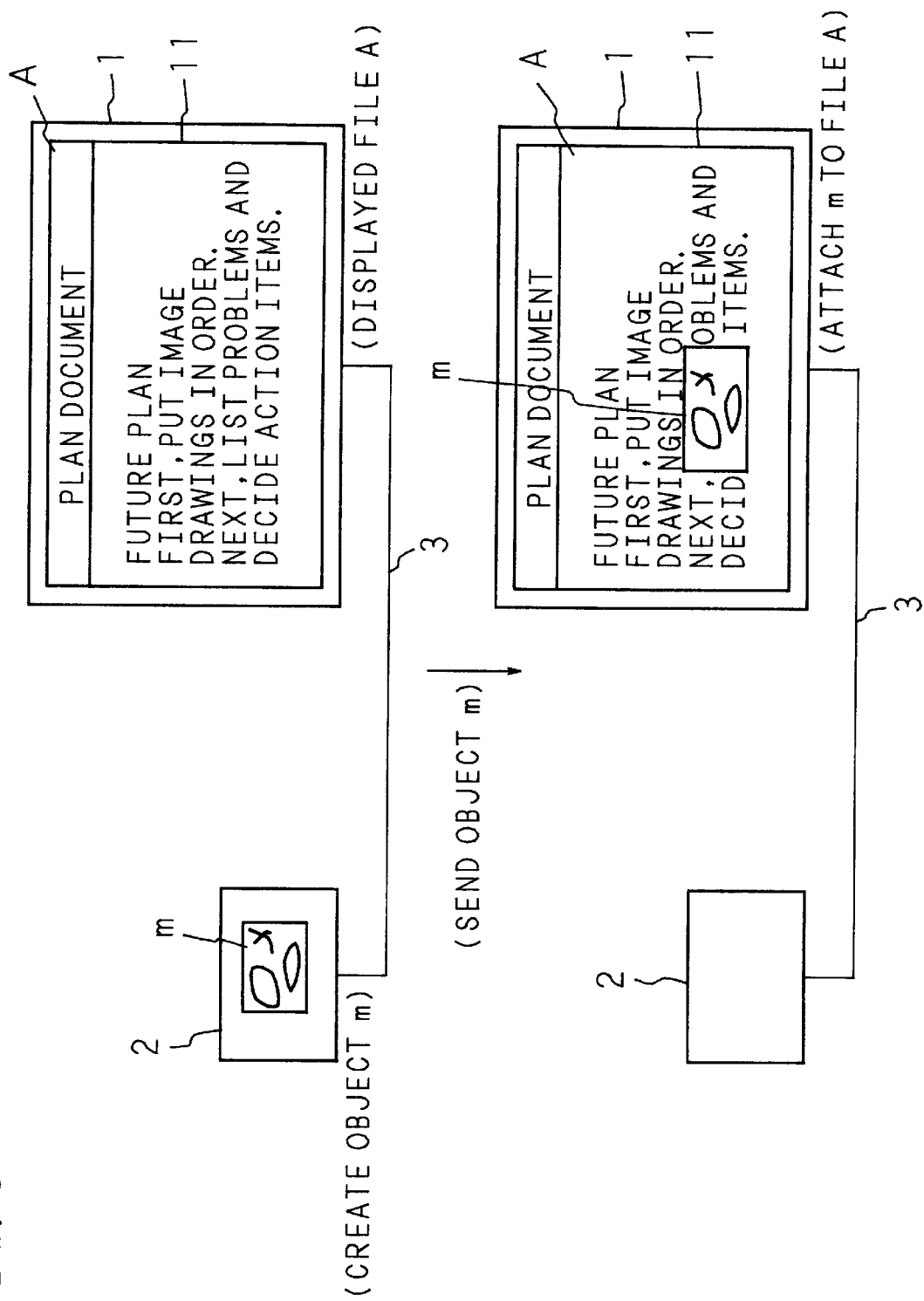
FIG. 6 is a schematic view showing an attachment method (according to a first embodiment) of establishing the relation of an object created by the personal information processing apparatus to a file displayed on the common information processing apparatus.

A first embodiment will now be described in which the relation is established by the attachment method from the personal information processing apparatus 2 to the common information processing apparatus 1. In the first embodiment, an object created by the personal information processing apparatus 2 is related to a file displayed on the common information processing apparatus 1 by the attachment method. FIG. 6 is a schematic view showing this embodiment. An object m is created by the personal information processing apparatus 2, and the created object m is sent to the common information processing apparatus 1 through the data communication passage (LAN) 3. The object m sent from the personal information processing apparatuses 2 is, by the attachment/embedding control unit 34, related to the file A displayed on the common display unit 11 of the common information processing apparatus 1. Thus, the object m is automatically attached to the file A.

Second Embodiment

Figure 7:
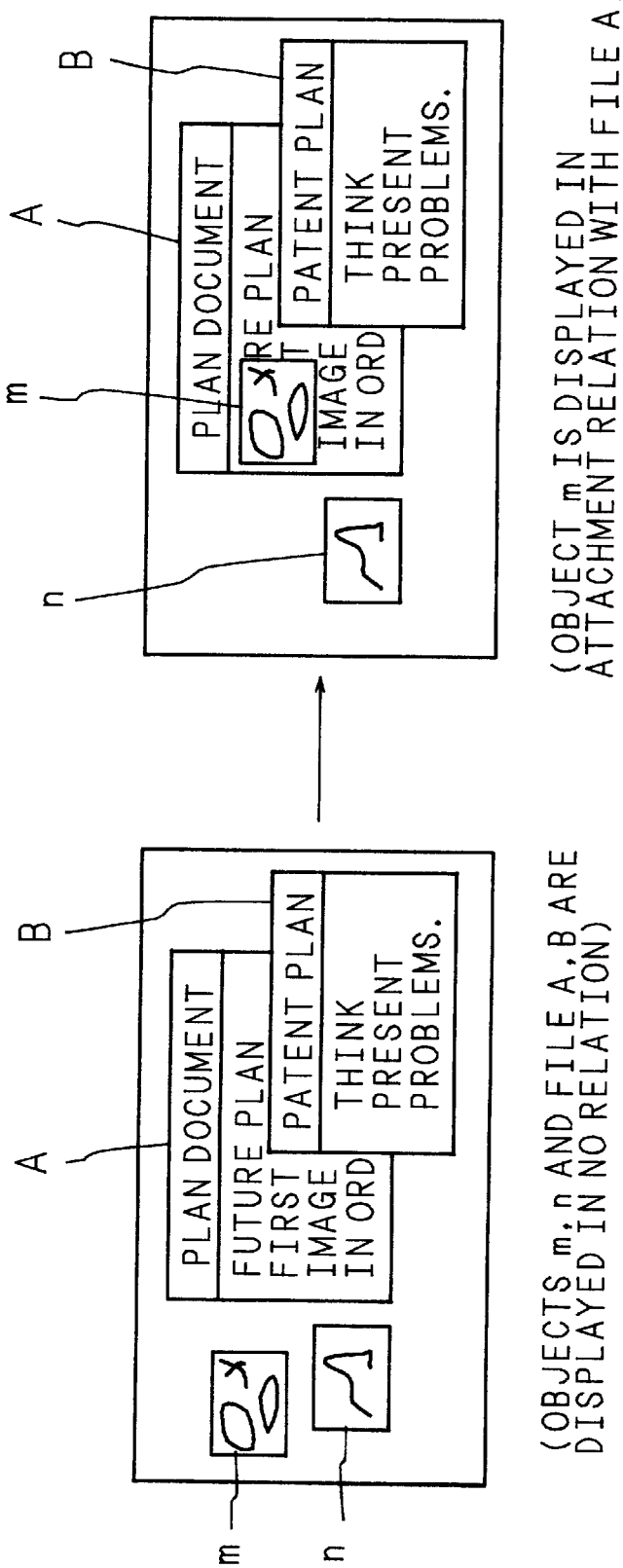
FIG. 7 is a schematic view showing an attachment method (according to a second embodiment) of establishing the relation of an object created by the personal information processing apparatus to a file displayed on the personal information processing apparatus.

A second embodiment will now be described in which the relation is established by the attachment method in the common information processing apparatus 1 or the personal information processing apparatus 2. In the second embodiment, an object created by the common information processing apparatus 1 or the personal information processing apparatus 2 is related to a file displayed on the common display unit 11 of the common information processing apparatus 1 or the personal display unit 21 of the personal information processing apparatus 2 by the attachment method. FIG. 7 is a schematic view showing the second embodiment. A plurality of files A and B and objects m and n are, having no relation, displayed on the common display unit 11 of the common information processing apparatus 1 or the personal display unit 21 of the personal information processing apparatus 2. When an instruction is issued to establish the relation of the object m to the file A by the attachment method, the object m is attached to a display region for the file A and then displayed.

The operations for establishing the relation by the attachment method, canceling the same and establishing the relation by the embedding method and canceling the same will now be described. A process which will be described below is performed such that an object related to a file by the attachment method or the embedding method is controlled by the object control unit 33 in accordance with an object control table created for each file.

Third Embodiment

Figure 8:
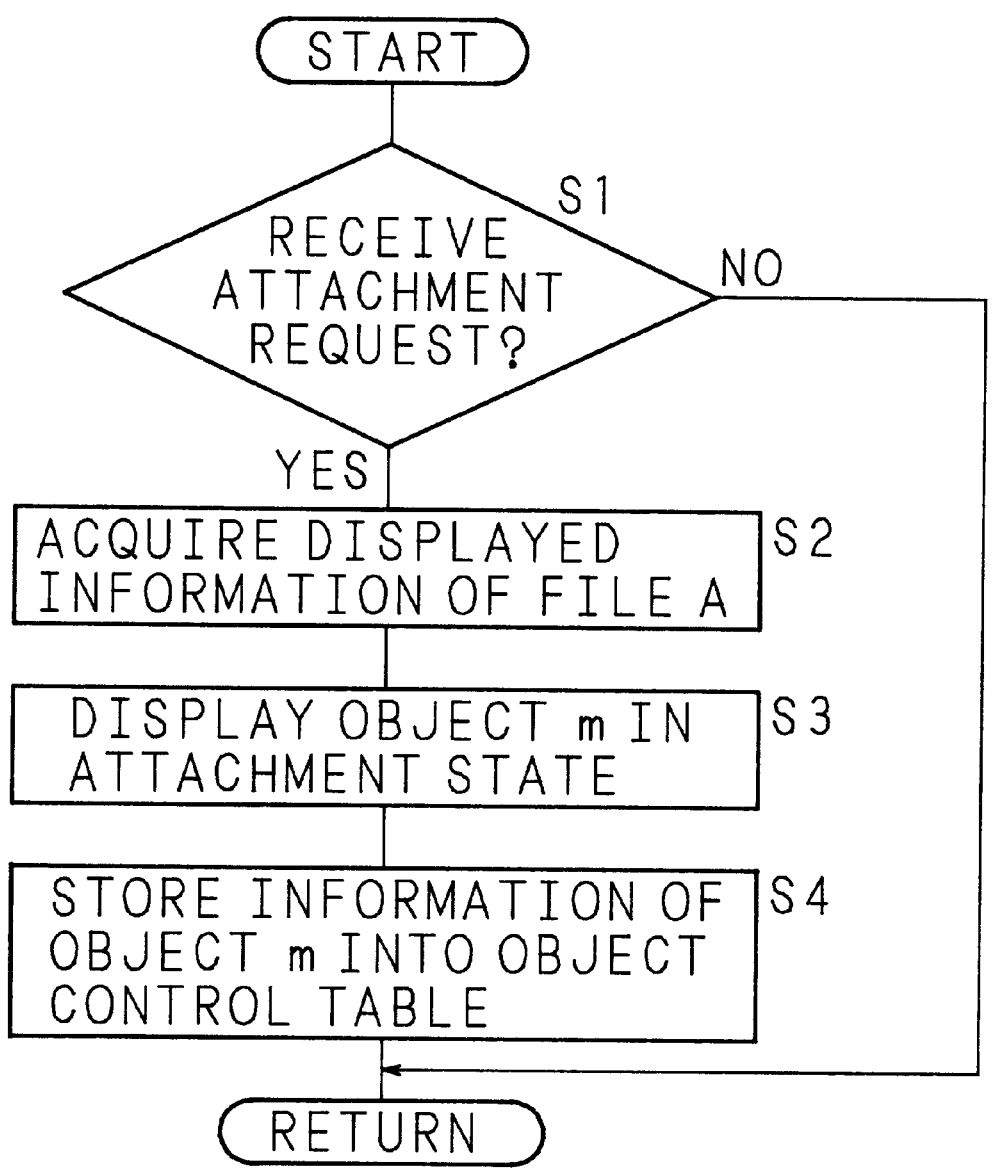
FIG. 8 is a flow chart of a process (according to a third embodiment) for establishing the relation by the attachment method.

A third embodiment will now be described in which an object is related to a file by the attachment method in a state where the object and the file exist without relation (in which a state shown in FIG. 4A is shifted to a state shown in FIG. 4B). FIG. 8 is a flow chart showing a process according to the third embodiment.

Initially, whether or not an attachment request has been made is determined (S1). If no attachment request has been made (NO in S1), the operation returns. If the attachment request has been made (YES in S1), that is, if the user has operated the input unit 12 or 22 to select an arbitrary object, instruct a file to which the relation will be established and perform the attachment operation, the attachment/embedding control unit 34 receives the message of the attachment request from the object control unit 33. The message of the attachment request includes information (identifiers m and A in the example shown in FIGS. 4A to 4C) indicating an object and a file, to which the object is related by the attachment method.

Then, the attachment/embedding control unit 34 makes an inquiry to the information storage unit 36 about display information of the file A indicating the position and size of the file A to which the object is attached (S2). Then, the attachment/embedding control unit 34 instructs the display executing unit 31 to display the object m in a state where the object m is related to the file A by the attachment method (S3)(see FIG. 4B). At this time, the object m is moved onto the file A and, for example, the color of the object m is changed so that the change in the state is expressed. If the object m is related to the file A by the attachment method, the object m follows the movement of the file A. Thus, the object m is not brought to the outside of the region in which the file A is displayed.

Then, the state of the object m is set to be "attachment" and information of the object m is recorded into an object control table for the file A previously created for recording the object to be attached to or embedded in the file A (S4). If the object control table has not been created, it is created this time to record information of the object m.

Fourth Embodiment

Figure 9:
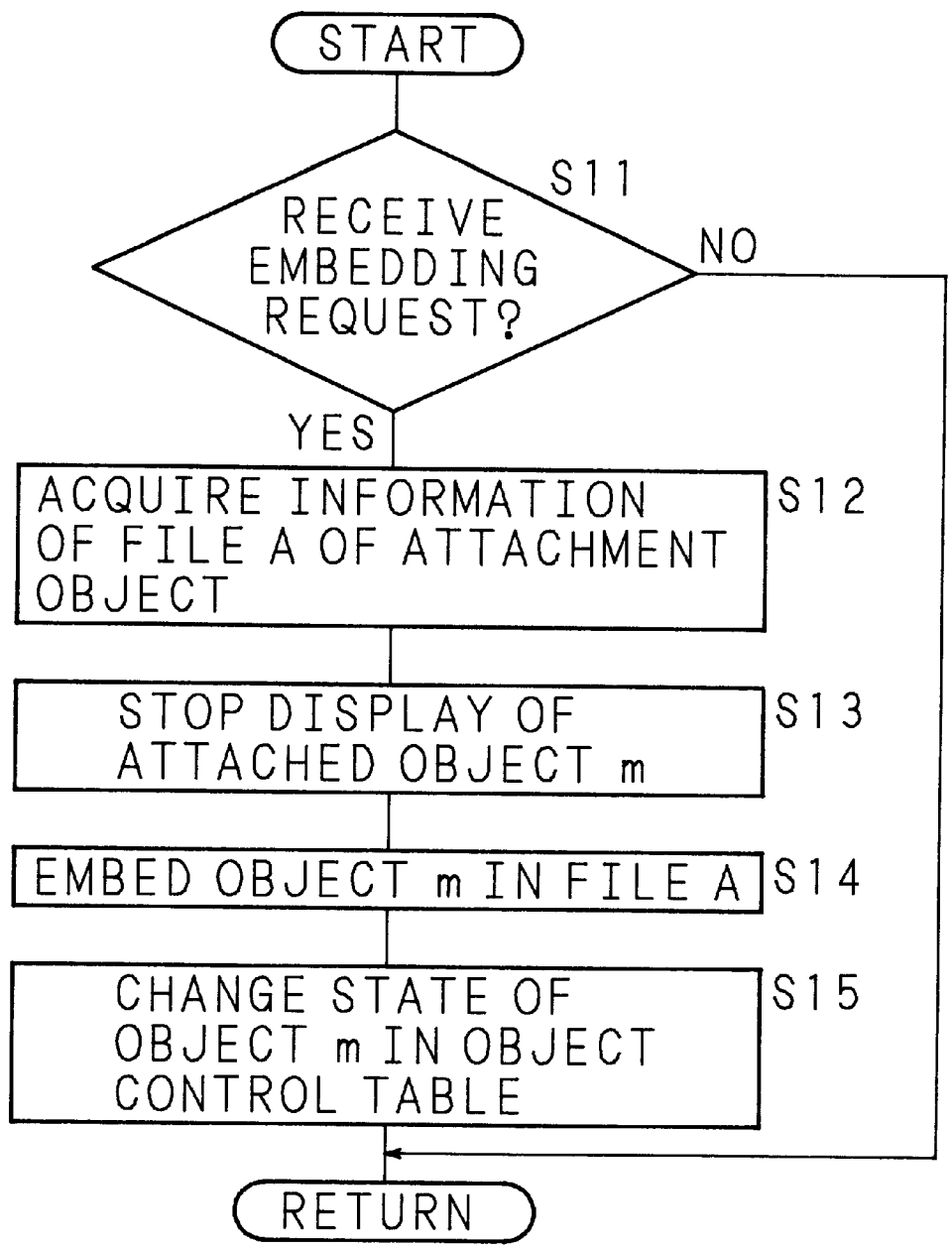
FIG. 9 is a flow chart of a process (according to a fourth embodiment) for establishing the relation by the embedding method.

A fourth embodiment will now be described in which an object is related to a file by the embedding method in a state where the object is related to the file by the attachment method (in which a state shown in FIG. 4B is shifted to a state shown in FIG. 4C). FIG. 9 is a flow chart showing a process according to the fourth embodiment.

Initially, whether or not an embedding request has been made is determined (S11). If no embedding request has been made (NO in S11), the operation returns. If the embedding request has been made (YES in S11), that is, if the user has operated the input unit 12 or 22 to select an arbitrary object related to a file by the attachment method and perform the embedding operation, the attachment/embedding control unit 34 receives the message of the embedding request from the object control unit 33. The message of the embedding request includes information (identifier m in the example shown in FIGS. 4A to 4C) indicating the attached object to be related by the embedding method.

Then, a reference to the object control table having information of the attached object recorded therein is made to acquire information (identifier A) of the file to which the object is attached (S12). Then, the attachment/embedding control unit 34 issues an instruction to the display executing unit 31 to interrupt the display of the attached object m (S13).

Then, an embedding message is sent to the file starting application so that a process is performed in such a manner that the object m is inserted between information items of the file A at a position adjacent to a position just below the present position of the object m (S14). When the embedding process has been completed, the state of the object m in the object control table for the file A is changed from the state "attachment" to a state "embedding" (S15).

Fifth Embodiment

Figure 10:
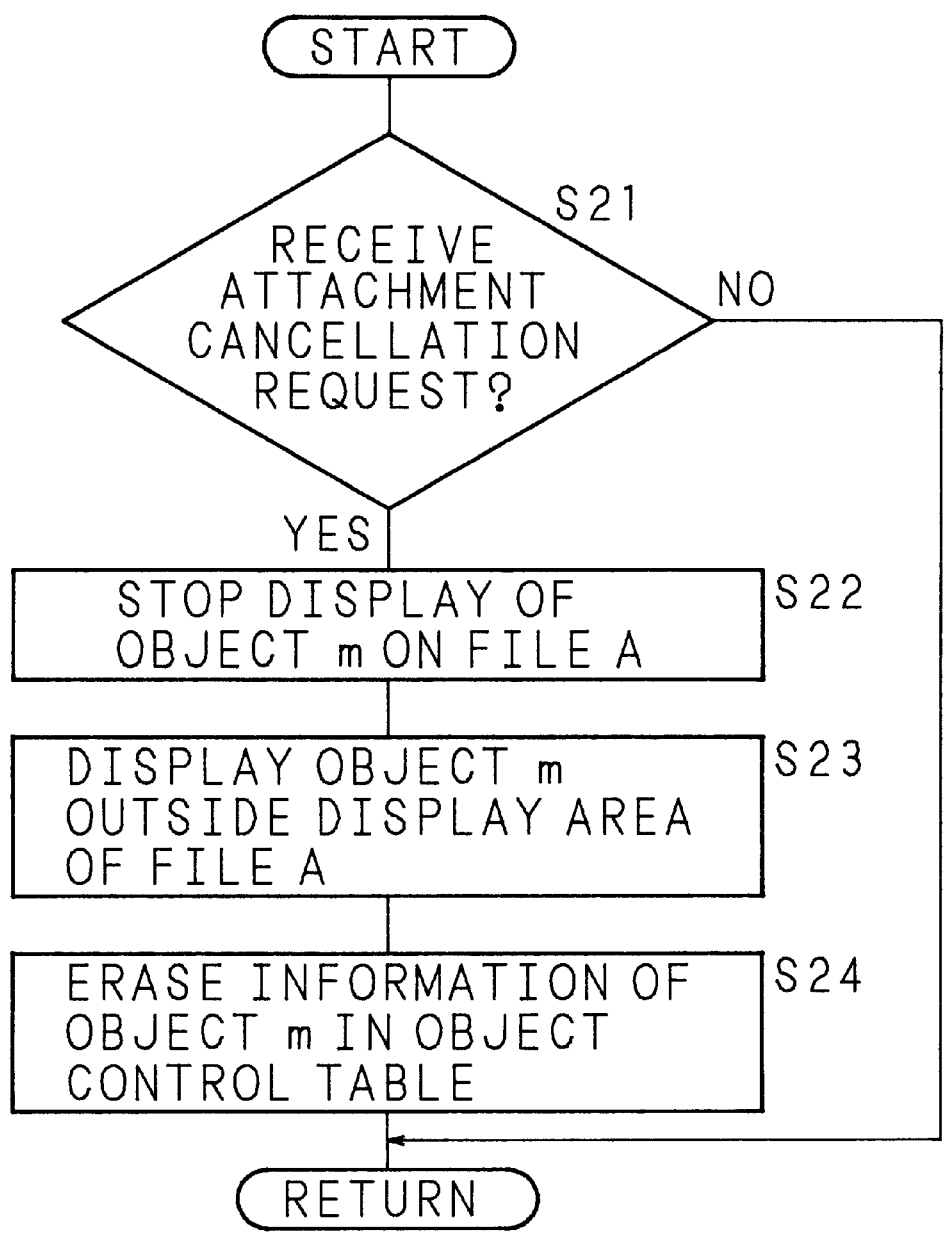
FIG. 10 is a flow chart of a process (according to a fifth embodiment) for canceling the relation established by the attachment method.

A fifth embodiment will now be described in which the relation of an object to a file established by the attachment method is canceled and the object is independently displayed (in which a state shown in FIG. 4B is shifted to a state shown in FIG. 4A). FIG. 10 is a flow chart showing a process according to the fifth embodiment.

Initially, whether or not a request to cancel the attachment of the object has been made is determined (S21). If the request to cancel the attachment has not been made (NO in S21), the operation returns. If the request to cancel the attachment has been made (YES in S21), that is, if the user has operated the input unit 12 or 22 to select an arbitrary object related to a file by the attachment method and perform the attachment canceling operation, the attachment/embedding control unit 34 receives a message to cancel the attachment from the object control unit 33. The message to cancel the attachment includes information (identifier m in the example shown in FIGS. 4A to 4C) indicating the attached object, the relation of which established by the attachment method is canceled.

Then, the attachment/embedding control unit 34 issues an instruction to the display executing unit 31 to interrupt display of the attached object m (S22). Then, the attachment/embedding control unit 34 issues another instruction to the display executing unit 31 to independently display the object m on the outside of the region in which the file A, to which the object m has been attached, is being displayed (S23). Then, information about object m is erased from the object control table for the file A (S24).

Sixth Embodiment

Figure 11:
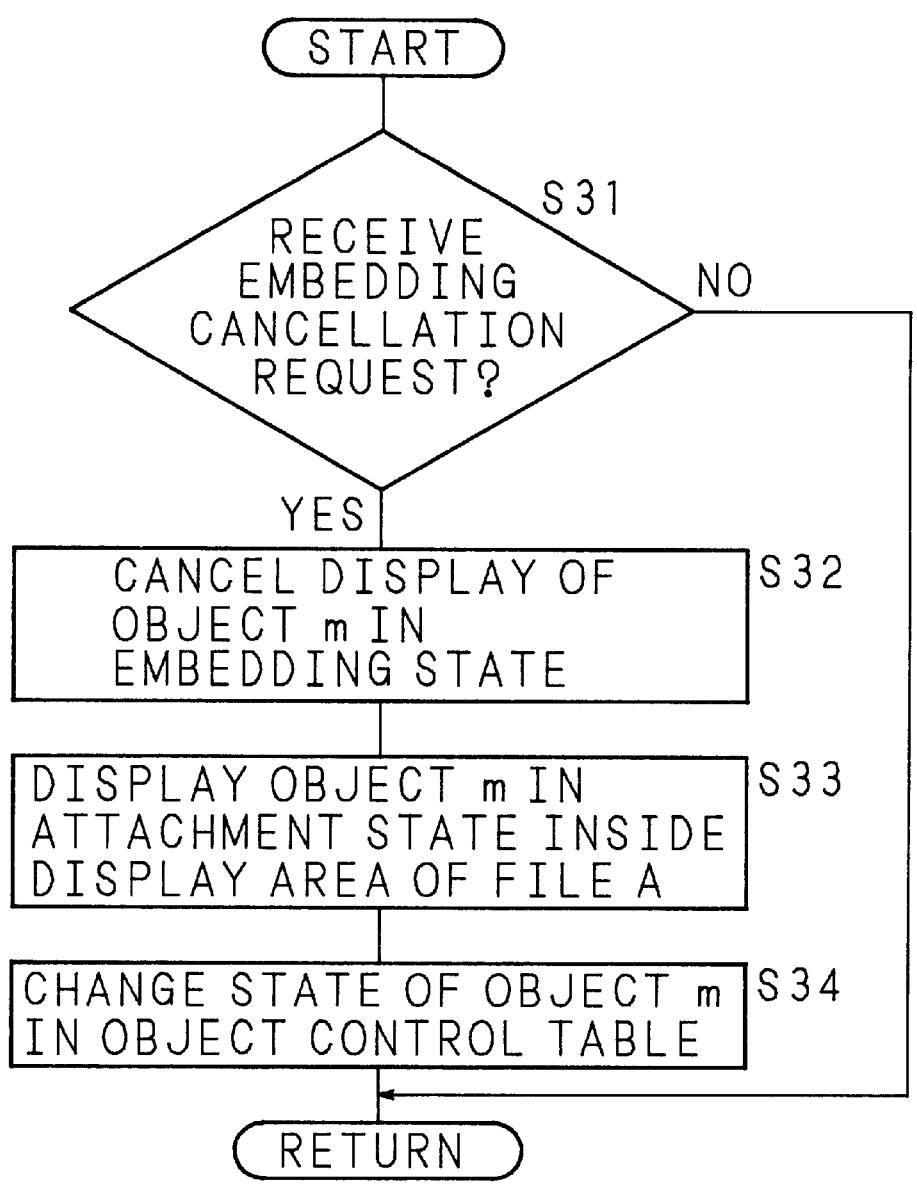
FIG. 11 is a flow chart of a process (according to a sixth embodiment) for canceling the relation established by the embedding method.

A sixth embodiment will now be described in which a state in which an object is related to a file by the embedding method is shifted to a state in which the object is related to the file by the attachment method (in which a state shown in FIG. 4C is shifted to a state shown in FIG. 4B). FIG. 11 is a flow chart showing a process according to the sixth embodiment.

Initially, whether or not a request to cancel the embedding of the object from a file has been made is determined (S31). If the request to cancel the embedding has not been made (NO in S31), the operation returns. If the request to cancel the embedding has been made (YES in S31), that is, if the user has operated the input unit 12 or 22 to select an arbitrary object embedded in the file and perform the operation to cancel the embedding, the display indicating that the object m is embedded in the file A is canceled by the OLE function (S32). The object control unit 33 receives a message to cancel the embedding, and then instructs the attachment/embedding control unit 34 to perform attachment display.

The attachment/embedding control unit 34 receives information (the identifier m) indicating the object which must be returned from the embedding state to the attachment state, and acquires information of the object m from the object control table. Thus, the attachment/embedding control unit 34 displays the object m in the region in which the file A is displayed while attaching the object m (S33). Then, the state of the object m which is "embedding" is, in the object control table for the file A, changed to the state "attachment" (S34).

Although the foregoing embodiments have the structure in which all of the attached objects and embedded objects are controlled by one object control table, the attached objects and embedded objects may be controlled by individual control tables (an attachment control table and an embedding control table).

In the above-mentioned case, the fourth embodiment is arranged in such a manner that information of the object m in the attachment control table is erased after the process for embedding the object m has been completed. Then, the information is, together with a pass for the object m to the starting up application, shifted to the embedding control table. The sixth embodiment is arranged in such a manner that information of the object m in the embedding control table is erased in a case where the object m has been returned from the embedded display to the attached display. Then, information of the object m is added to the attachment control table.

Another method of controlling the object may be employed in which only the attached objects are controlled with the object control table and embedded objects are individually controlled for each data.

The object which is to be related to a file by the attachment method or the embedding method may be graphic data, text data or material data. If the object is text data or material data, a portion or the overall portion of the object may be displayed when the object is displayed. Moreover, a symbol for specifying the object and having a shape different from the displayed file may be used.

Seventh Embodiment

Figure 12:
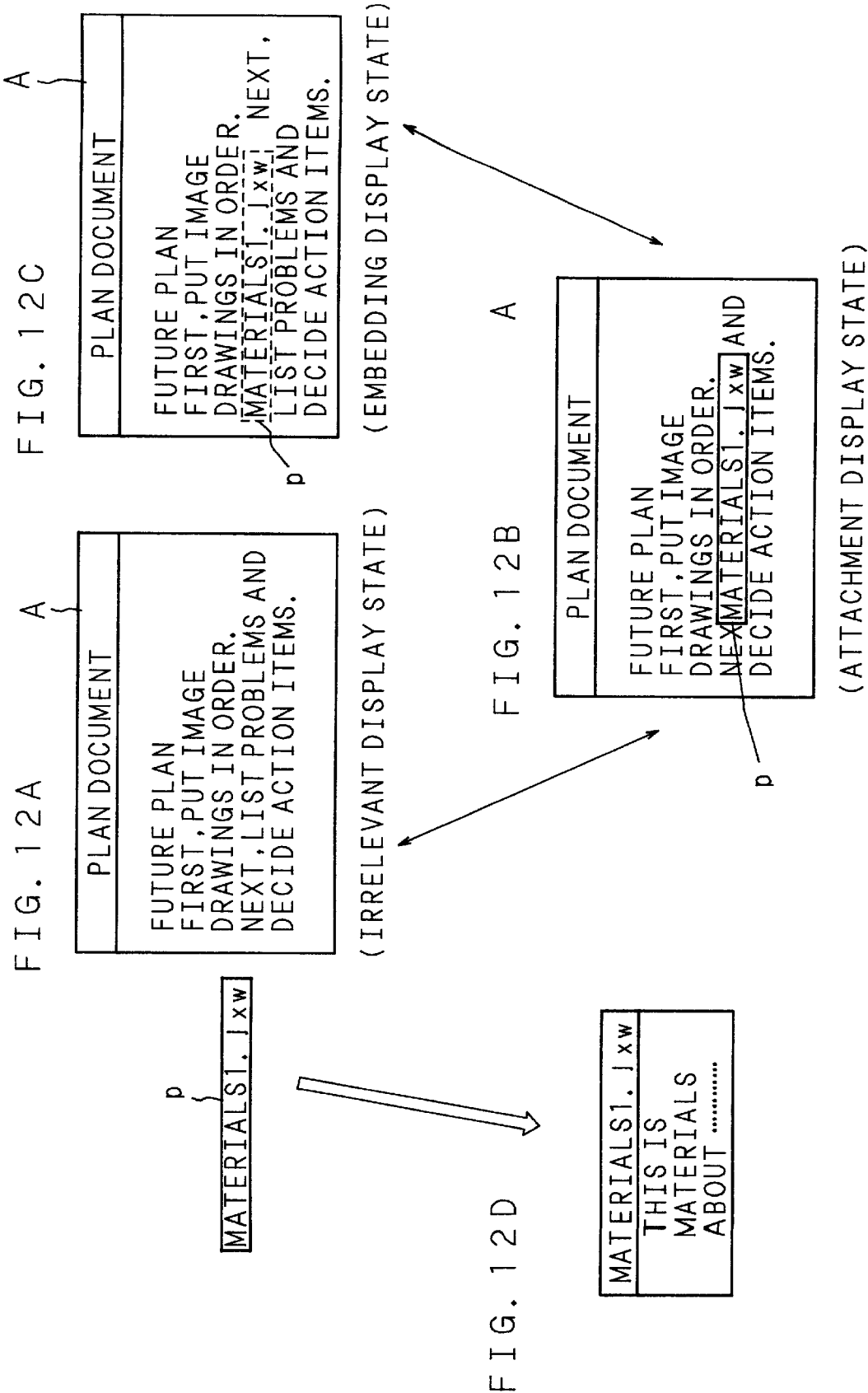
FIGS. 12A to 12D are schematic views showing an attachment/embedding method (according to a seventh embodiment) of establishing the relation in a case where the object is a file which is started up by an arbitrary application.

FIGS. 12A to 12D are schematic views showing an embodiment of relation establishment in which an object which is to be related to a file is a file which is started up by an arbitrary application. A material object p having the contents shown in FIG. 12D is in a state having no relation with an existing file A (see FIG. 12A). In the foregoing state, the relation can be established by the attachment method (see FIG. 12B). Moreover, the relation can be established by the embedding method in the state where the relation has been established by the attachment method (see FIG. 12C). In this case, the material object p is always displayed by using file name (material 1. jwx) for specifying the material object p.

Eighth Embodiment

Figure 13:
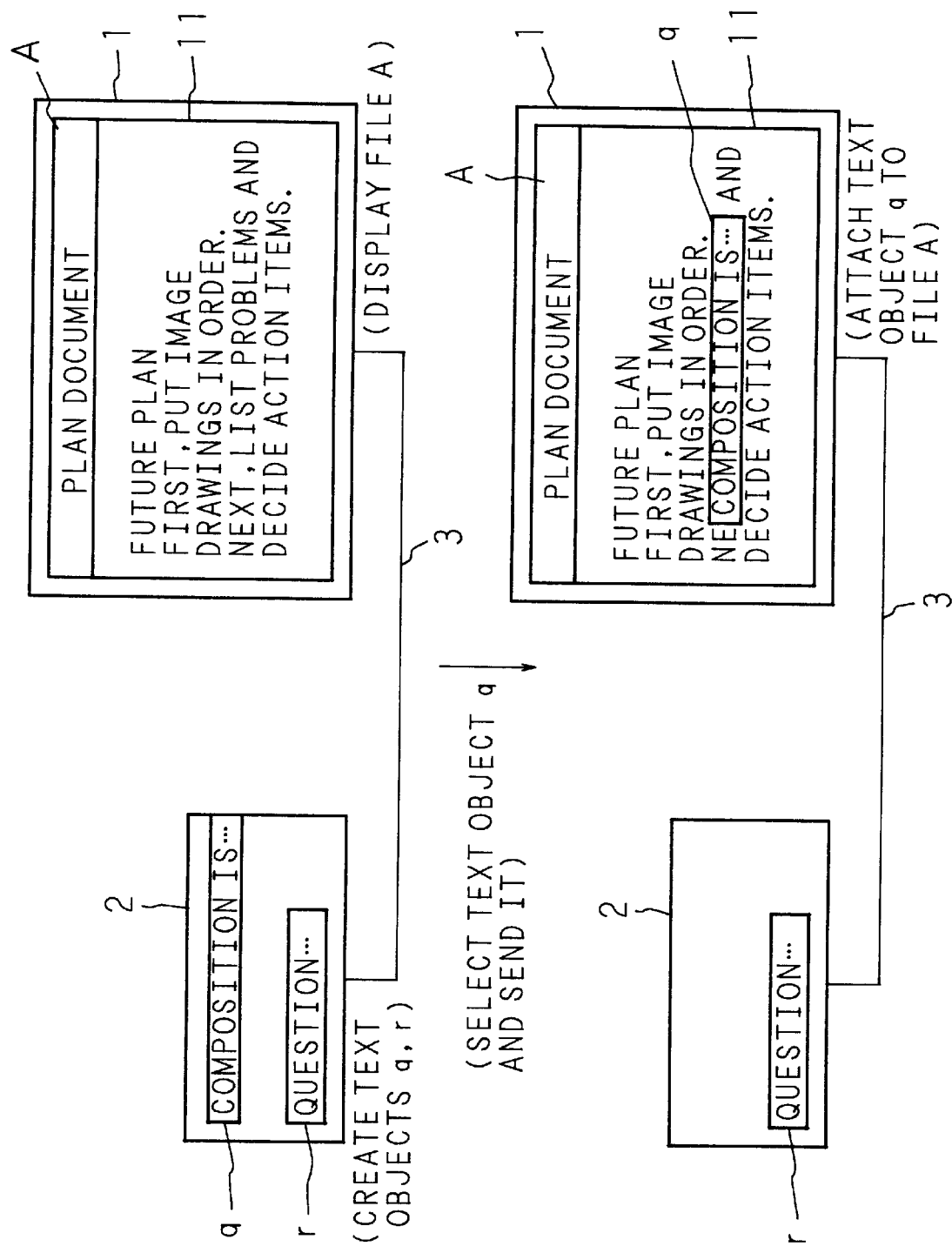
FIG. 13 is a schematic view showing a method (according to an eighth embodiment) of establishing the relation when the object is text data.

FIG. 13 is a schematic view showing an embodiment for establishing the relation in a case where the object which is to be related to a file is text data. A text object q which is to be related by the attachment method to a file A displayed on the common display unit 11 of the common information processing apparatus 1 is selected from text objects q and r created by the personal information processing apparatus 2, and then the selected text object q is sent to the common information processing apparatus 1 through the data communication passage (LAN) 3. Thus, the sent object q is related so that the object q is automatically attached to the file A and displayed.

Figure 14:
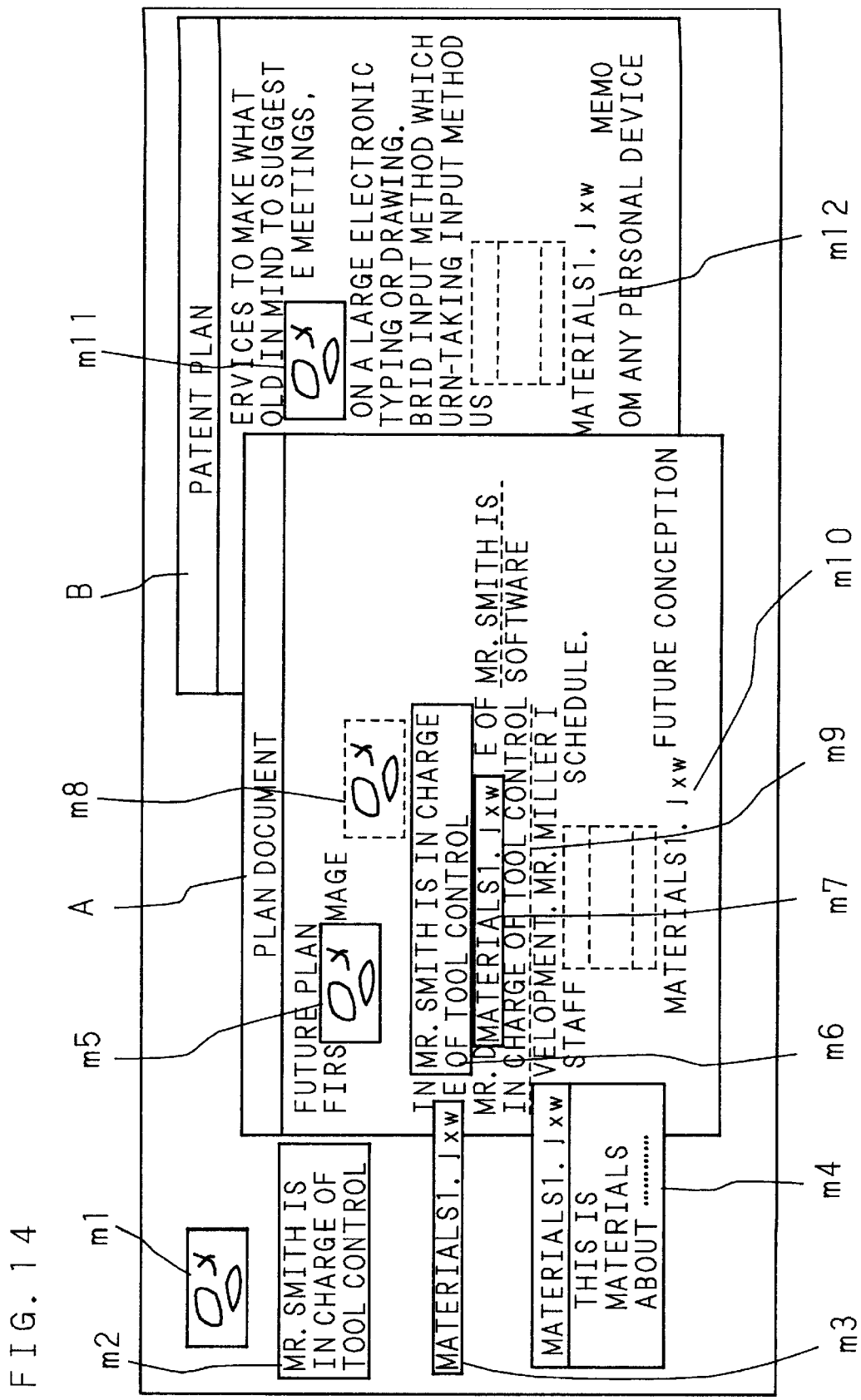
FIG. 14 is a diagram showing examples of the object and the file

FIG. 14 is a schematic view showing an example of display on the common display unit 11 of the common information processing apparatus 1 such that a file and an object are related to each other. Two document files A and B and a plurality of objects m1 to m12 are displayed on the common display unit 11. The objects include three types consisting of graphic objects, text objects and material objects. Each object has the above-mentioned three states as the independent state, the attachment state and the embedding state with respect to the document files A and B. Although the material object is displayed with the file name, the contents of the material may be displayed by starting up the application. Note that insertion of a document which is the content of the text is substituted for embedding of the text object.

Referring to FIG. 14, reference numeral m1 represents a graphic object in the independent state and m2 represents a text object in the independent state. Reference numerals m3 and m4 respectively represent material objects in the independent state. The material object m3 is displayed with the file name, while the material object m4 is displayed with the contents of the file. Reference numeral m5, m6 and m7 represent a graphic object, a text object and a material object attached to the document file A. Reference numeral m8 represents a graphic object embedded in the document file A, and m9 represents a text object embedded in the document file A and displayed in such a manner that its text is inserted. Reference numeral m10 represents a material object embedded in the document file A. Reference numeral m11 represents a graphic object attached to the document file B, and m12 represents a material object embedded in the document file B.

The above-mentioned conference aiding system according to the present invention enables any attendant of the conference to relate an object, such as a comment or a reference material, created by the attendant, to the overall portion of a displayed file without a necessity of considering the position of the object on the file. Therefore, a large number of objects can be related to a file so as to be displayed in a short time. As a result, an excellent effect can be obtained in that the quality of the document serving as a tentative document for the conference can be improved, opinions can clearly be communicated and the electronic conference can efficiently be performed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A conference aiding system structured such that a main information processing apparatus having a main display unit for displaying information and a plurality of sub-information processing apparatuses each having a sub-display unit for displaying information are connected to one another through a communication passage to communicate information among the information processing apparatuses, and a file and an object, said conference aiding system comprising:

a first relation establishing unit to establish a first relation in which an object is attached to a file, and thereby displayed at an unspecific position with respect to the file on said main display unit and/or said sub-display unit such that movement of one of the object and the file causes movement of the other on said display unit, and scrolling of said one does not cause synchronous scrolling of the other; and a second relation establishing unit to establish a second relation between the object and the file in which the object is embedded and displayed at a specific embedding position of the file on said main display unit and/or said sub-display unit such that the first relation is cancelled when the second relation is established, wherein said first relation is restored when said second relation is cancelled.

2. A conference aiding system according to claim 1, further comprising:

means for controlling said first relation establishing unit to establish the first relation between the object and the file as a previous step for establishing the second relation.

3. A conference aiding system according to claim 1, further comprising:

means for canceling the first relation of the object.

4. A conference aiding system according to claim 1, further comprising:

means for canceling the second relation of the object.

5. A conference aiding system according to claim 1, wherein said sub-information processing apparatus includes means for creating an object and means for sending the created object to said main information processing apparatus through said communication passage, said main information processing apparatus includes means for displaying the sent object on said main display unit in such a manner that the object has established the first relation with the file displayed on said main display unit.

6. A conference aiding system according to claim 1, wherein said sub-information processing apparatus includes means for creating an object and means for displaying the created object on said sub-display unit in such a manner that the object has established the first relation with the file displayed on said sub-display unit.

7. A computer memory product storing a computer program for causing a file and an object, which are information items, to be displayed on a display unit for displaying information in a state where the object is related to the file or a state where the object is independent from the file, said computer program comprising the steps of:

establishing a first relation in which an object is attached to a file and thereby displayed at an unspecific position with respect to the file on said display unit such that movement of one of the object and the file causes movement of the other on said display unit, and scrolling of said one does not cause synchronous scrolling of the other; and establishing a second relation between the object and the file in which the object is embedded and displayed at a specific position of a file on said display unit such that the first relation is cancelled when the second relation is established and said first relation is restored when said second relation is cancelled.

8. A computer memory product according to claim 7, said computer program further comprising the steps of:

canceling the first relation of the object; and canceling the second relation of the object.

9. A computer memory product having computer readable program code means capable of reading by a computer for causing a file and an object, which are information items, to be displayed on a display unit for displaying information in a state where the object is related to the file or a state where the object is independent from the file, said computer readable program code means comprising:

program code means for causing the computer to establish a first relation in which an object is attached to a file and thereby displayed at an unspecific position with respect to the file on said display unit such that movement of one of the object and the file causes movement of the other on said display unit, and scrolling of said one does not cause synchronous scrolling of the other; and program code means for causing the computer to establish a second relation between the object and the file in which the object is embedded and displayed at a specific position of the file on said display unit such that the first relation is cancelled when the second relation is established and said first relation is restored when said second relation is cancelled.

10. A computer memo product according to claim 9, said computer readable problem code means further comprising:

program code means for causing said computer to cancel the first relation of the object; and program code means for causing said computer to cancel the second relation of the object.

11. A conference aiding system structured such that a main information processing apparatus having a main display unit for displaying information and a plurality of sub-information processing apparatuses each having a sub-display unit for displaying information are connected to one another through a communication passage, said conference aiding system comprising:

a first relation establishing unit to establish a first relation in which an object is attached to a file, and thereby displayed at an unspecific position with respect to the file on said main display unit and said sub-display unit such that movement of one of the object and the file causes movement of the other on said display unit, and scrolling of said one does not cause synchronous scrolling of the other;

an attachment control table to store information of the object and information of the file according to an attachment relation;

a second relation establishing unit to establish a second relation between the object and the file in which the object is embedded and displayed at a specific embedding position of the file on said main display unit and said sub-display unit; and an embedding control table to store the information of the object and the information of the file according to an embedding relation, said embedding control table receiving the information of the object and the information of the file from said attachment control table, wherein the information of the object is erased from the attachment control table after establishing of the second relation by said second relation establishing unit.

12. The conference aiding system according to claim 11, wherein after said second relation establishing unit establishes the second relation, the object is displayed in the file using an associated file name.

13. The conference aiding system according to claim 11, wherein the embedded object is graphic data, text data, or material data.

14. A conference aiding system structured such that a main information processing apparatus having a main display unit for displaying information and a plurality of sub-information processing apparatus, each having a sub-display unit for displaying information, are connected to one another through a communication passage and that a file and an object, which are information items, are displayed in the main display unit in a state where the object is related to the file or a state where the object is independent from the file, said conference aiding system comprising:

a sending unit for sending the object created in the sub-information processing apparatus to the main information processing apparatus through the communication passage;

a first relation establishing unit for establishing a first relation in which the sent object is displayed at an unspecific position of a file displayed in the main display unit such that movement of the sent object or the file causes movement of the sent object or the file on the main display unit, and scrolling of the sent object or the file does not cause synchronous scrolling of the sent object or the file on the main display unit, or in which a second object embedded at a specific position of the file as a second relation is retrieved and the second object is displayed at an unspecific position of the file, such that movement of the second object or the file causes movement of the second object or the file on the main display unit and scrolling of the second object or the file does not cause synchronous scrolling of the second object or the file on the main display unit; and a second relation establishing unit for establishing the second relation in which the sent object, after establishing the first relation, is embedded and displayed at a specific position of the file displayed on the main display unit.

\* \* \* \* \*